United States Patent [19]

Uetsuki et al.

[11] Patent Number: 4,710,689
[45] Date of Patent: Dec. 1, 1987

[54] DEVICE FOR PREVENTING BACKLASH ON A FISHING REEL

[75] Inventors: Haruo Uetsuki; Takehiro Kobayashi; Hiroto Yamane, all of Hiroshima, Japan

[73] Assignee: Ryobi, Ltd., Fuchu, Japan

[21] Appl. No.: 877,009

[22] Filed: Jun. 20, 1986

[30] Foreign Application Priority Data

Jun. 21, 1985 [JP] Japan .............................. 60-94793[U]

[51] Int. Cl.[4] ............................................. G05B 11/01
[52] U.S. Cl. ................................... 318/630; 318/603; 318/614; 242/84.1 R
[58] Field of Search ............... 318/630, 311, 603, 269, 318/614; 242/84.1 R

[56] References Cited

U.S. PATENT DOCUMENTS 2,361,239 10/1944 Ransom .
2,465,932 3/1949 Romine .

FOREIGN PATENT DOCUMENTS 59-178070 6/1984 Japan .

Primary Examiner—William M. Shoop, Jr.
Assistant Examiner—D. Martin
Attorney, Agent, or Firm—Finnegan, Henderson, Farabow, Garrett and Dunner

[57] ABSTRACT

A fishing reel that includes an eddy current brake mechanism that applies a braking force to the spool of the reel when the speed or acceleration of the spool, as detected electrically, reaches a predetermined value. The reel further includes electrical means for detecting, calculating and comparing rotation of the spool to a predetermined value whereupon a magnetic brake slows the spool to prevent backlash.

11 Claims, 5 Drawing Figures

DEVICE FOR PREVENTING BACKLASH ON A FISHING REEL

BACKGROUND OF THE INVENTION

The present invention relates to a device for preventing backlash on a fishing reel in which a spool is braked by magnetic induction.

In a conventional device for preventing such backlash, a magnetic member has, on at least one side, a nonmagnetic electroconductive member which is rotated with the spool. The relative movement between the two members causes an eddy current in the nonmagnetic electroconductive member by the magnetic force of the magnetic member to magnetically brake the rotating spool thereby preventing backlash from being caused by the excessive rotation of the spool at the time of casting of a fishhook, fishline and so forth. Since the magnetic member cannot be adjusted during casting, the rotation of the spool is magnetically braked even before casting. For that reason, such a conventional device has a problem that the fishhook, fishline and so forth cannot be cast far enough.

In order to solve the problem, a device was proposed in the Japanese Utility Model Laid-open Gazette No. 59-178070. In this device, the rotation of the spool is automatically braked when a set time has passed since the start of the rotation of the spool. However, this type of device has problems in that it is very difficult to set a time that it takes for a fishhook, fishline and so forth to be cast to a predetermined place after the start of the rotation of the spool. The cast distance or the passed time varies from case to case. Such a device is effective if the fishhook, fishline and so forth land on the water after the lapse of the preset time. If, however, the fishhook, fishline and so forth land on the water before the lapse of the preset time or land on nearby water by mistake, rotation of the spool is not braked and backlash results.

SUMMARY OF THE INVENTION

The present invention was made in order to solve the above-mentioned problems.

It is an object of the present invention to provide a device in which the number of the pulses of the output signal from a sensor which detects the rotation of a spool is counted at every output signal from a reference clock circuit; the speed or acceleration of the rotation of the spool is calculated from the number of counted pulses; and the spool is braked when the calculated speed or acceleration has reached a preset value or a negative value. The braking of the spool is ceased when the calculated speed or acceleration has become zero. With the device, backlash can be completely prevented regardless of the distance of casting of fishhook, fishline and so forth. Furthermore, a failure in casting (i.e., a short cast) will not cause a lashback and the distance of the cast can be increased.

The device is provided for a fishing reel in which the rotation of a spool is controlled by causing an eddy current in a nonmagnetic electroconductive member which is rotated in conjunction with the rotation of the spool. The device comprises a sensor which detects the rotation of the spool; a counter circuit in which the number of the pulses of the output signal from the sensor is counted by a pulse counter at every output signal from a reference clock circuit; a calculation circuit which calculates the speed or acceleration of the rotation of the spool; and a control means for causing the eddy current in the nonmagnetic electroconductive member to occur when the calculated rotation or acceleration has reached the value preset by a data setting unit, thus solving the above-mentioned problems.

In a preferred embodiment when the number of the pulses generated in a prescribed time and corresponding to the speed or acceleration of the rotation of the spool has reached a preset value or a negative value, a magnet ring is rotated by a motor to brake the spool. When the number of the pulses in the prescribed time has become zero, the braking is ceased. For these reasons, the spool is only slightly braked during the casting of the fishhook, fishline and so forth. As a result, the distance of the cast is increased. Even if the distance of the actual cast is less than a set value, or the fishhook, fishline and so forth land on the nearby water due to a failure in casting, the spool is braked to prevent backlash.

DESCRIPTION OF THE PREFERRED EMBODIMENT

Figure 1:
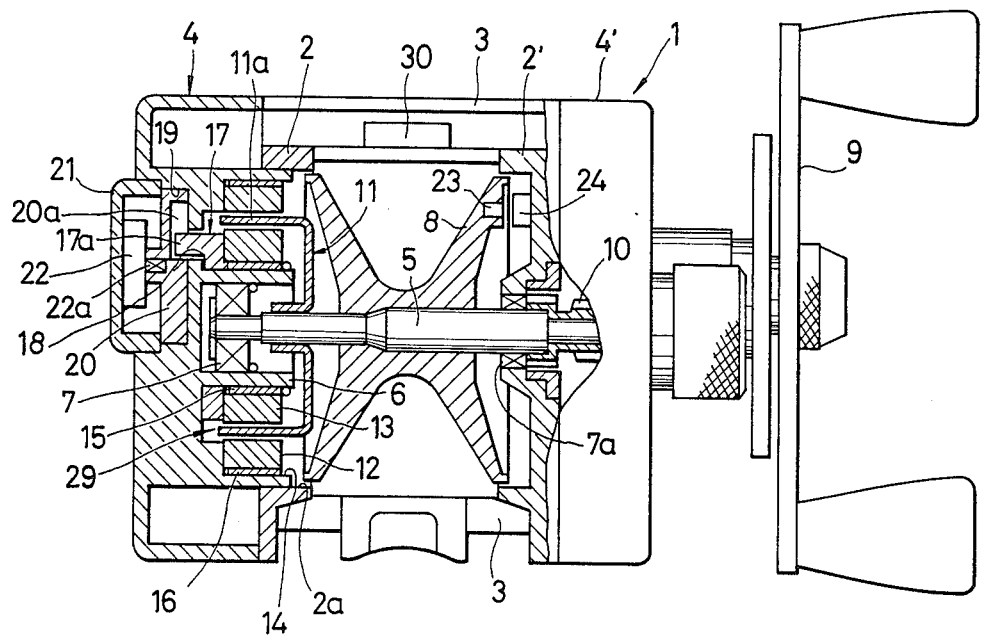
FIG. 1 shows a longitudinal cross-sectional view of a fishing reel backlash prevention device which is an embodiment of the present invention.

An embodiment of the present invention is described in detail with reference to the drawings. FIG. 1 shows the body 1 of a reel having both bearings is assembled as a frame wherein a right and a left side plates 2 and 2' are secured at a prescribed distance from each other by horizontal bars 3 and covers 4 and 4' are secured to the side plates 2 and 2'.

Both the ends of a spool shaft 5 are supported by bearings, on one side the bearing 7 on the support portion 6 of the cover 4 and on the other by bearing 7' in the cover 4' so that a spool 8 is rotatably supported between the side plates 2 and 2'. A pinion 10 is fitted on the right-hand portion (as to the drawing) of the spool shaft 5 so that the pinion can be slid in the axial direction and can be rotated by a handle 9 through drive gears (not shown). The spool shaft 5 is connected to or disconnected from the handle 9 by sliding the pinion 10 on the spool shaft 5 in the axial direction.

A nonmagnetic electroconductive member 11 shaped as a horizontal cup is secured to the left-hand portion of the spool shaft 5. The peripheral portion 11a of the nonmagnetic electroconductive member 11 protrudes into the cover 4 through the opening 2a in the side plate 2. Magnet rings 12 and 13 are disposed together with annular yokes 15 and 16 inside and outside the peripheral portion 11a of the member 11 and are located in an annular recess 14 provided in the cover 4.

The inner magnet ring 13 can be rotated together with an attachment 17 provided on the annular yoke 15. The attachment 17 has a projection 17a extending outwards and inserted into the hole 18 of the cover 4 so that the projection can be moved within a prescribed range.

Figure 2:
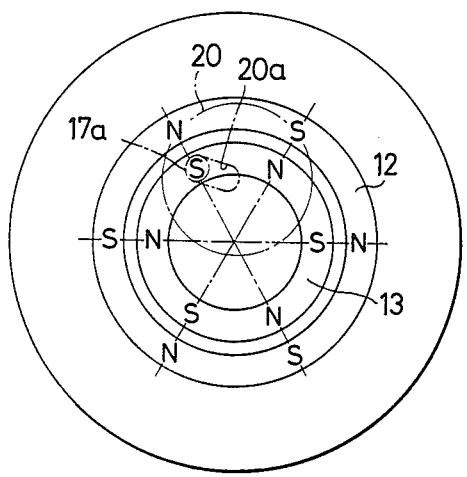
FIG. 2 shows a schematic view of the device in the state of maximum braking.

The outside surface of the cover 4 has a circular recess 19 communicating with the hole 18. A disk-shaped adjusting cam 20 is rotatably supported in the recess 19. One side of the adjusting cam 20 has a straight cam groove 20a as shown in FIG. 2. The projection 17a of the attachment 17 is slidably fitted in the cam groove 20a. The cam groove 20a extends in a radial direction from the center of the adjusting cam groove 20a when the cam 20 is rotated.

A motor 22 is secured to the interior side of a cover 21 fitted in the outer portion of the recess 19. The central portion of the adjusting cam 20 is secured to the shaft 22a of the motor 22 so that the cam 20 is rotated by the motor.

In each of the magnet rings 12 and 13, north poles and south poles are alternately located at regular intervals in the circumferential direction, as shown in FIG. 2. A control means 29 for causing an eddy current in the nonmagnetic electroconductive member 11 is comprised of the magnet rings 12 and 13 and the annular yokes 15 and 16.

A nonmagnetic electroconductive member 11 is made of a nonmagnetic substance such as copper or aluminum.

Figure 4:
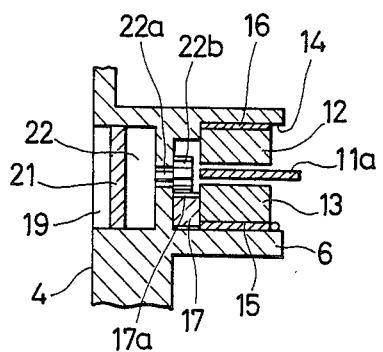
FIG. 4 shows a longitudinal sectional view of a modification of the magnet ring rotation means of the device.

The magnet ring 13 may be rotated by the motor 22 through a gear transmission means shown in FIG. 4, instead through the adjusting cam 20. In this case, it is preferred that a gear 17a be machined on the peripheral portion of the attachment 17, a gear 22b is provided on the motor shaft 22a, with both the gears 17a and 22b being engaged with one another.

A magnet 23 is secured on one side of the spool 8. A magnetic sensor 24, which detects the rotation of the spool 8, is secured on the side plate 2' so as to face the area on which the magnet 23 is revolved. The magnetic sensor 24 is connected to a pulse counter 26 of a counter circuit 25 shown by the block diagram of FIG. 3. The pulse counter 26 is connected to a latch circuit 27 and a reference clock circuit 28.

Figure 3:
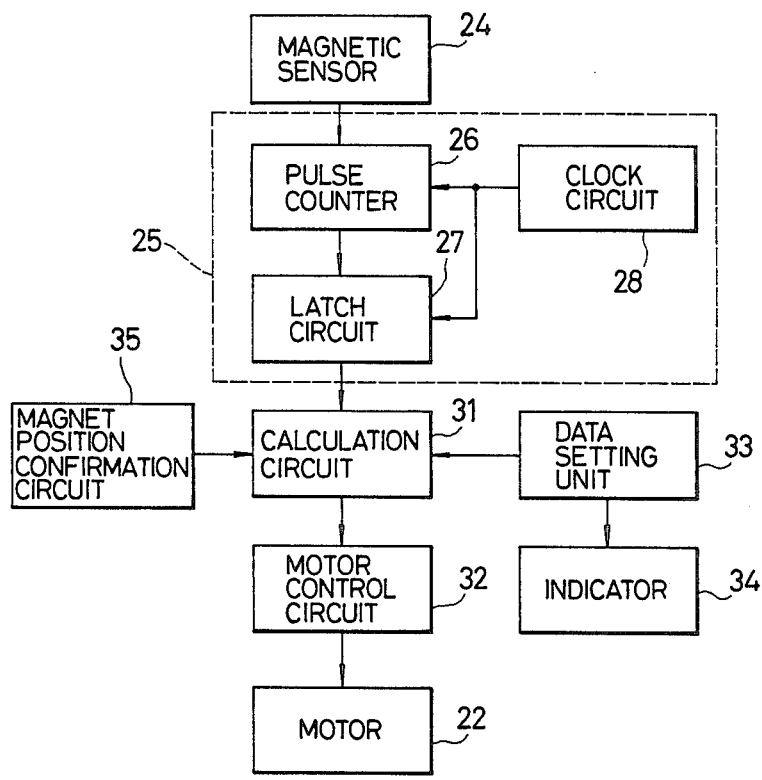
FIG. 3 shows a block diagram for the device.

Shown at 30 in FIG. 1 is a central processing unit. Shown at 31, 32, 33, 34 and 35 in FIG. 3 are a calculation circuit, a motor control circuit, a data setting unit, an indicator and a magnet position confirmation circuit, respectively.

The rotation of the spool 8 is detected by the magnetic sensor 24. The number of the pulses of the output signal from the sensor 24 is counted by the pulse counter 26 at every output signal from the reference clock circuit 28. The central processing unit 30 calculates the speed or acceleration of the rotation of the spool 8 from the counted number of pulses. When the calculated speed or acceleration has reached a preset value, the central processing unit 30 sends a control signal to the motor 22 to turn the adjusting cam 20 (or the gear 22b by the rotation of the motor) to rotate the inner magnet ring 13 mounted on the attachment 17 sufficient to change the relation of the magnetic poles of the magnet ring 13 to those of the outer magnet ring 12 to control a braking force acting on the spool 8.

The counter circuit 25 receives the output signal from the magnetic sensor 24, and sends the number of counted pulses to the calculation circuit 31. At that time, the number of the pulses between the adjacent output signals from the reference clock circuit 28, which generates the output signal in a prescribed time, is counted. The counted number of the pulses in the prescribed time is sent to the calculation circuit 31 through the latch circuit 27.

The calculation circuit 31 calculates the speed or acceleration of the rotation of the spool 8 from the number of counted pulses in each time interval. When the calculated speed or acceleration has reached the value preset by the data setting unit 33, the reversible motor 22 is put in operation by the motor control circuit 32 to turn the inner magnet ring 13 to a position shown in FIG. 2, to increase the eddy current to brake the spool 8.

When the pulse counter 26 detects no pulse as a result of the stoppage of the outgoing fishline and the rotation of the spool 8, the motor 22 is reversed by the motor control circuit 32 in response to an output signal from the magnet position confirmation circuit 35 which may be a limit switch, a rotary encoder or the like. Consequently, the magnet ring 13 is reversed to such a position relative to the magnet ring 12 as to decrease the eddy current.

Figure 5:
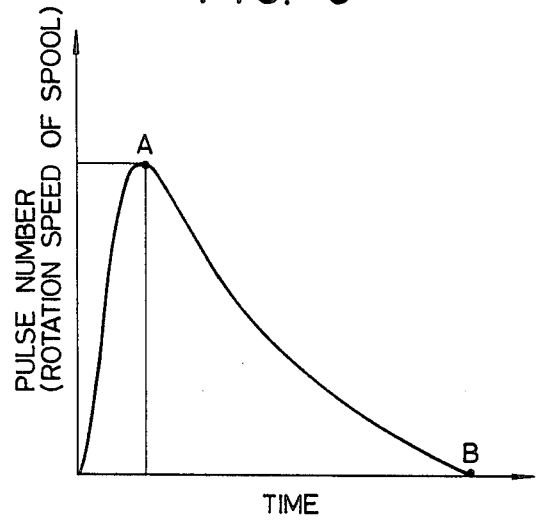
FIG. 5 shows a graph indicating the relation between the revolution speed of a spool and time in casting.

An example of operation is now described with reference to FIG. 5 which shows a graph indicating the relation between the revolution speed of the spool 8 and the time in casting the fishline, etc. At a point A where the acceleration of the rotation of the spool 8 reaches a maximum, an increase in the rotational frequency of the spool in a prescribed time such as 0.01 sec., becomes a preset value such as zero. A decrease in the rotational frequency of the spool in such a preset time becomes a preset negative value. For example, when the rotational frequency reaches 1,000 corresponding to a maximum speed and a preset value of zero, or a frequency of 950 after reaching a maximum of 1,000 in the prescribed time of 0.01 sec. corresponding to a preset negative value indicating deceleration, the magnet ring 13 is turned in such a direction (to the position shown in FIG. 2) by the motor 22 to increase the eddy current to brake the rotation of the spool 8 to prevent backlash. At another point 8 where the outgoing of the fishline and the rotation of the spool 8 stop, in other words, when the pulse counter 26 detects no pulses, the magnet ring 13 is reversed to such a position by the motor 22 as to place the north poles of the magnet ring 13 in the face of those of the other magnet ring 12 and place the south poles of the magnet ring 13 in the face of those of the other magnet ring 12 to decrease the eddy current.

The present invention has been disclosed in terms of preferred embodiments. The invention is not limited thereto and is defined by the appended claims and their equivalents.

What is claimed is:

1. A device for preventing backlash on a fishing reel wherein said reel includes a spool and a nonmagnetic electroconductive member rotated therewith, said member at times applying a braking force upon generation of an eddy current therein, said device comprising:
   a sensor for detecting rotation of said spool and generating an output signal, said output signal being comprised of pulses relating to rotation of said spool;
   a reference clock circuit for generating reference pulses at predetermined time intervals;
   counter means including a circuit for counting the number of said pulses from said sensor and said reference clock circuit;
   means governed by said counter means for calculating at least the speed of rotation of said spool; and
   control means governed by said calculating means for generating an eddy current in said nonmagnetic electroconductive member at times when the speed of said spool reaches a preset value.

2. The device of claim 1 wherein said device includes a data input means for providing a preset value for the speed of said spool.

3. The device of claim 1 wherein said control means includes a plurality of magnets adjacent said nonmagnetic electroconductive member and said control means further includes means for moving said magnets in relation to said nonmagnetic electroconductive member.

4. The device of claim 3 wherein said control means includes an electric motor for moving said magnets, said motor being operatively connected to said magnets through gear means.

5. The device of claim 3 wherein said control means includes an electric motor for moving said magnets, said motor being operatively connected to said magnets through cam means.

6. The device of claim 1 wherein said electroconductive member comprises a cup-shaped member affixed to said spool, the rim portion of said cup-shaped member projecting between said magnets, said magnets being comprised of an annular array of inner magnets inside said cup-shaped member and an annular array of outer magnets outside said cup-shaped member.

7. The device of claim 5 wherein said inner magnets include means for rotating said inner magnets with respect to said outer magnets.

8. The device of claim 6 wherein said rotating means comprise cam means.

9. The device of claim 6 wherein said rotating means comprise gear means.

10. The device of claim 4 further comprising a magnet position confirmation circuit providing an output signal upon no pulse detection by said counter means, so that said electric motor is rotated reversely to reduce said eddy current.

11. The divice of claim 1, wherein said means for calculating the speed of rotation of said spool also includes calculation of the acceleration of said spool.

* * * * *